(12) United States Patent
McKee

(10) Patent No.: US 8,668,556 B2
(45) Date of Patent: Mar. 11, 2014

(54) PORTABLE WHEEL RIM POLISHER

(75) Inventor: Brian Lowe McKee, Porepunkah (AU)

(73) Assignee: Raleigh Corporation Pty Ltd, Porepunkah, Victoria (AU)

(*) Notice: Subject to any disclaimer, the term of this patent is extended or adjusted under 35 U.S.C. 154(b) by 282 days.

(21) Appl. No.: 13/109,575

(22) Filed: May 17, 2011

(65) Prior Publication Data

US 2011/0287701 A1    Nov. 24, 2011

(30) Foreign Application Priority Data

May 18, 2010    (AU) ................................ 2010902150

(51) Int. Cl.
*B24B 23/00*    (2006.01)

(52) U.S. Cl.
USPC ............................ 451/348; 451/360; 451/424

(58) Field of Classification Search
USPC ............. 108/147.22; 451/174, 190, 340, 342, 451/348, 356, 360, 361, 362, 424, 425, 426, 451/463, 464, 559, 911, 913, 920
See application file for complete search history.

(56) References Cited

U.S. PATENT DOCUMENTS

| | | | | |
|---|---|---|---|---|
| 489,412 A * | 1/1893 | Davidson | ...................... | 451/155 |
| 1,341,500 A * | 5/1920 | Durham | ....................... | 451/227 |
| 1,425,121 A * | 8/1922 | McFeaters | .................... | 451/358 |
| 1,736,085 A * | 11/1929 | Lint et al. | ...................... | 451/140 |
| 1,798,224 A * | 3/1931 | Rinau | ........................... | 451/344 |
| 1,951,977 A * | 3/1934 | Hanus | .......................... | 451/548 |
| 1,987,837 A * | 1/1935 | Mall | ............................. | 451/344 |
| 2,000,611 A * | 5/1935 | Prange | ......................... | 451/540 |
| 2,166,281 A * | 7/1939 | Beck | ............................ | 451/464 |
| 2,286,293 A * | 6/1942 | Mall | ............................. | 451/344 |
| 2,556,207 A * | 6/1951 | Mueller | ....................... | 280/654 |
| 2,596,986 A * | 5/1952 | Curtis | .......................... | 280/641 |
| 2,597,325 A * | 5/1952 | Hodges | ........................ | 451/258 |
| 2,675,285 A * | 4/1954 | Terry et al. | ....................... | 5/618 |
| 2,727,341 A * | 12/1955 | Fisher | .......................... | 451/464 |
| 2,755,606 A * | 7/1956 | Ronvold et al. | ............... | 451/354 |
| 2,767,523 A * | 10/1956 | Vasbinder | .................... | 451/464 |
| 2,828,587 A * | 4/1958 | Miller | .......................... | 451/354 |
| 2,975,447 A * | 3/1961 | Vuchinas | ...................... | 15/53.4 |
| 3,510,129 A * | 5/1970 | Reuther | ........................ | 482/34 |
| 3,948,005 A * | 4/1976 | Whitsett | ...................... | 451/354 |
| 4,754,713 A * | 7/1988 | Chatenay epouse Compagnone | ................ | 100/144 |
| 5,407,380 A * | 4/1995 | Salkewicz | ..................... | 451/340 |
| 6,309,291 B1 * | 10/2001 | Cox | ................................ | 451/464 |
| 6,558,240 B2 * | 5/2003 | Negley | ......................... | 451/464 |
| 6,957,999 B1 * | 10/2005 | Motta et al. | .................... | 451/11 |

* cited by examiner

*Primary Examiner* — Lee D Wilson
*Assistant Examiner* — Tyrone V Hall, Jr.
(74) *Attorney, Agent, or Firm* — Alston & Bird LLP

(57) ABSTRACT

The specification discloses a portable vehicle wheel polisher (10) having a rotatable polishing head (23) adapted to rotate about a substantially horizontal axis (15), the polisher (10) including a drive motor and gear reduction arrangement (14) connected to a drive shaft (17) for the rotatable polishing head (23), adjustable suspension means (18) enabling the horizontal rotation axis (15) to be selectably raised or lowered relative to an installed vehicle wheel on a vehicle, ground engaging wheels (12) carrying the adjustable suspension means (18) enabling the portable vehicle wheel polisher (10) to be moved to a position that engages the polishing head (23) with the installed vehicle wheel and to a separate position disengaged from the installed vehicle wheel.

14 Claims, 2 Drawing Sheets

PORTABLE WHEEL RIM POLISHER

FIELD OF THE INVENTION

The present invention relates to polishing apparatus for cleaning and polishing the wheels of road vehicles including trucks, prime movers and trailers.

BACKGROUND OF THE INVENTION

Road vehicles such as trucks, prime movers and particularly large load carrying trailers tend to have many wheels. Often the wheels of such vehicles are either plated with a metal such as chrome or are themselves made from a metal alloy that provides, at least when new, a pleasing metal finish. Owners and drivers of such vehicles normally like to keep such wheels clean and the metal surfaces polished to keep the vehicle in as close as possible to an as new condition and appearance. The difficulty with doing so is that to date cleaning and polishing such vehicle wheels, when installed on the vehicle, has required a difficult, laborious and time consuming manual task, particularly when there are numerous wheels on the vehicle to be cleaned/polished. Cleaning and polishing installed vehicle wheels with mechanised equipment has been difficult because of the multitude of vehicle wheels sizes, tyre sizes and hub and rim wheel profiles used on such vehicles. Cleaning and polishing equipment is known but generally requires the wheel to be physically removed from the vehicle to be operated successfully. With working vehicles, having sufficient down time to enable wheels to be removed, cleaned and polished, and reinstalled, is also problematic.

The objective therefore of the present invention is to provide a portable vehicle wheel rim/hub polisher capable of use to polish vehicle wheels when installed on a vehicle. A preferred objective is to provide such a portable vehicle wheel rim/hub polisher that is adjustable to satisfactorily operate with vehicle wheels of differing sizes and profiles.

SUMMARY OF THE INVENTION

Accordingly, the present disclosure describes a portable vehicle wheel polisher including a rotatable polishing head adapted, in use, to rotate about a substantially horizontal rotation axis; drive means connected to said polishing head to, in use, rotate said polishing head about said horizontal rotation axis; adjustable support means enabling said horizontal rotation axis to be selectably raised or lowered relative to an installed vehicle wheel on a vehicle, and ground engaging wheel means carrying said adjustable support means enabling said portable vehicle wheel polisher to be moved to engage said polishing head with the installed vehicle wheel and to a separate position disengaged from said installed vehicle wheel.

Conveniently, the polishing head includes multiple circumferentially spaced support arms radially extending outwardly from said horizontal rotation axis, each said support arm carrying a polishing member having an outer profile approximating a profile of at least part of the installed vehicle wheel. The polishing head may include a central hub with said support arms being connected thereto. Conveniently the support arms are releasably connected to said central hub. Preferably at least two and potentially three or four equally spaced said support arms are provided. In a preferred arrangement the radial position of the or each said polishing member is adjustable. To achieve such adjustability, the length of each said support arm might be selectably adjustable. Alternatively, the position of connection of the support arms to the central hub might be selectably variable.

The polishing members may be a moulded semi-solid foam polishing material. The material may be a plastics polishing material. Conveniently, releasable connection means connects each said polishing member to a said support arm. Preferably, each said connection means allows the polishing members to rock relative to the support arm about a radial direction in a direction parallel to the horizontal rotation axis, at least during movement of the polishing head into engagement with the installed vehicle wheel. In a preferred embodiment, the connection means may be secured in a predetermined position once engaged with the installed vehicle wheel.

In a preferred embodiment, each of the support arms may be constructed as a spring enabling limited fore and aft movement of the polishing members in a direction parallel to the horizontal rotation axis. Conveniently each said support arm has a first radial section acting as the spring and a second axial section arranged generally parallel to the horizontal rotation axis, the polishing members being connectable to a said second axial section.

Conveniently, the polishing head further includes a further polishing element connected thereto for rotation about said horizontal rotation axis, said further polishing element surrounding said horizontal rotation axis and being adapted, in use, to engage a central region of the installed vehicle wheel. Preferably said further polishing element is releasably connected to the central hub of the polishing head. The further polishing element may have a forward profiled face approximating a profile of at least part of the installed vehicle wheel.

Preferred embodiments of the present invention will be described hereafter with reference to the accompanying drawings.

DETAILED DESCRIPTION OF THE DRAWINGS

Figure 1:
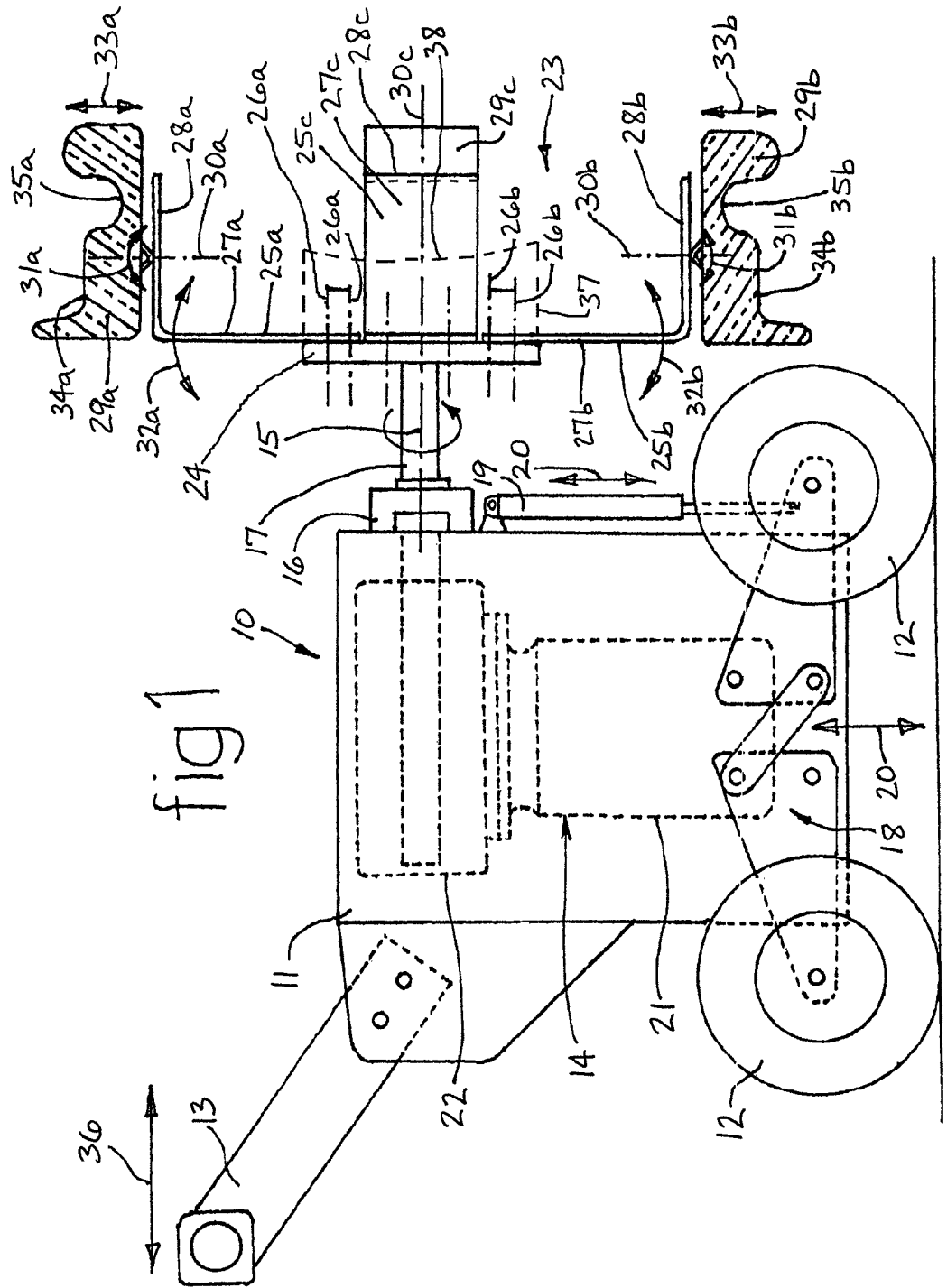
FIG. 1 is a schematic side elevation view of a portable vehicle wheel polisher according to the present invention.

FIG. 1 shows a portable wheel rim polisher 10 comprised of a box shaped body 11 supported by four ground engaging wheels 12 and a handle 13 enabling an operator to move the polisher 10 into a use location adjacent an installed wheel on a vehicle (truck, trailer, prime mover or the like). The body 11 of the polisher 10 houses a drive motor and gear box 14 for providing a rotational drive output along a horizontal rotation axis 15 via bearings 16. The output drive shaft 17 is arranged to rotate about the horizontal rotation axis 15. The ground engaging wheels 12 are supported by a height adjusting suspension 18 is mounted between the wheels 12 and the body 11. One or more gas struts 19 are mounted between the suspension 18 and the body 11 to assist in moving the body 11 up or down as indicated by the arrows 20, such movement correspondingly also moving the horizontal rotation axis 15 vertically to adjust, as may be desired, the height of the axis 15. The drive motor 21 of the drive motor and gear box 14 may be electrically driven or alternatively, any other form of motor 21 could be used including internal combustion engines if an electricity supply is not available. The gear box 22 allows the output drive shaft 17 and thereby the polishing head 23 to rotate at a desirable low speed to effect polishing of a wheel rim in use as described hereafter.

The polishing head 23 comprises a central hub 24 connected to and rotatable with the output drive shaft 17. A plurality of support arms 25a, 25b, 25c are releasably connected to the central hub 24 by bolts or other fastening means indicated by reference numerals 26a, 26b. Each support arm 25a, 25b, 25c might conveniently be made of a spring material (e.g. spring steel) and includes a radial section 27a, 27b, 27c and an axial section 28a, 28b, 28c. A polishing member 29a, 29b, 29c is connected to the axial section 28a, 28b, 28c by suitable connection means indicated at 30a, 30b, 30c. Further details of the connection means 30a, 30b, 30c are described hereafter with reference to FIG. 2. The connection means allows the polishing members 29a, 29b, 29c to rock relative to the annexed axial arm section 28a, 28b, 28c as indicated by arrows 31a, 31b, 31c. The spring effect provided by the radial section 27a, 27b, 27c allows the polishing members 29a, 29b, 29c to rock to a limited extent as indicated by arrows 32a, 32b. Conveniently the connection position 26a, 26b of the radial section 27a, 27b, 27c of the support arms 25a, 25b, 25c to the central hub 24 can be varied to provide some adjustability of the radial position of the polishing members 29a, 29b, 29c as indicated by arrows 33a, 33b. In a possible alternative the radial sections 27a, 27b, 27c of the support aims 25a, 25b, 25c might be made variable in length to achieve the same effect.

Each polishing member 29a, 29b, 29c may be made from semi-solid foam material suitable for polishing the regions of the wheel or wheel rim as desired. The members 29a, 29b, 29c conveniently each have a profile surface 34 adapted to be at least complementary to the region of the wheel rim to be polished. If desired, a recessed region 35a, 35b might be provided in the profile surface 34a, 34b to enable the valve stem of the wheel to be cleared in use of the polisher 10. A further modification might include a further polishing member 37 releasably connected to the region of the central hub 24. This further polishing member 37 may have a forward profiled face 38 approximating a profile of a further part of the vehicle wheel.

Figure 2:
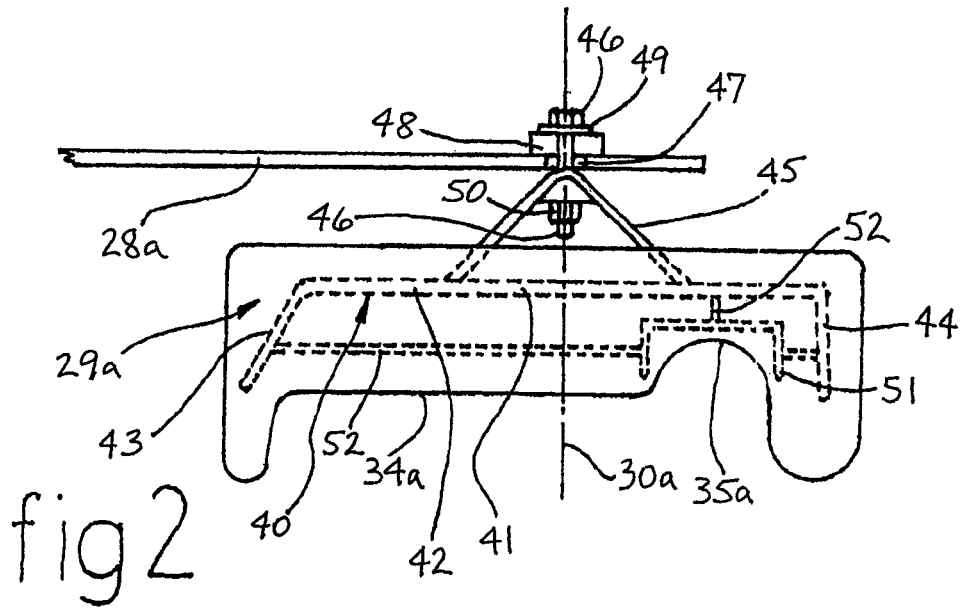
FIG. 2 is a detailed view of a polishing member as represented in FIG. 1.
Figure 3:
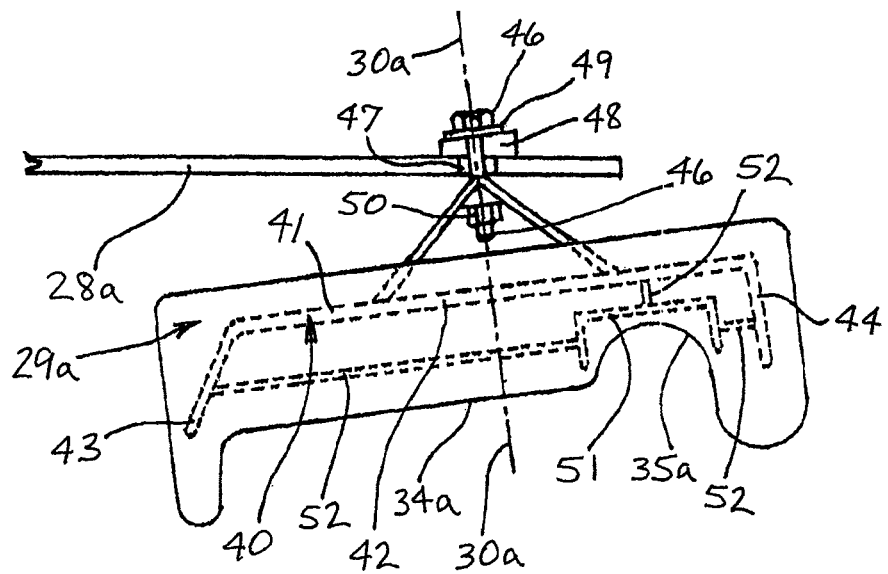
FIG. 3 is a view similar to FIG. 2 illustrating the possible rocking movement of the polishing member.

A polishing member 29a showing its connection arrangement to the axial arm section 28a of a support arm 25a is shown in FIGS. 2 and 3 it being recognized that the polishing members 29b, 29c may be similarly mounted. The semi-solid foam polishing material of the polishing member 29a is moulded onto a frame structure 40 comprising one or more generally U-shaped metal bar members 41 having an axially extending base section 42 and radial leg sections 43, 44. An angle iron bar section 45 is welded to the base section 42 or base sections 42 when two or more base members 41 are utilized. A connecting bolt (or bolts) 46 pass through the corner region of the bar section 45 and through an oversized aperture 47 in the axial arm section 28a of the support arm 25a. A rubber or elastomeric bush 48 and metal backing washer 49 are positioned between the connecting nut 50 and the arm section 28a. A nut 50 is welded in the corner of the bar section 45 with a threaded section of the bolt 46 being threaded into the nut 50. The physical arrangement permits the polishing member 29a to rock in the direction of arrows 31a (FIG. 1) as shown in FIG. 3, at least during positioning of the polishing member 29a against a wheel rim to be polished. As represented in FIGS. 2 and 3, the frame structure 40 might also include a metal channel element 51 to support the recessed region 35a for accommodating the wheel valve stem if desired. Other reinforcing rod members 52 might also be included. It will of course be appreciated that not all wheel rims have the same profile and it is recognized that alternate polishing members 29a having differing surface profiles 34 would be provided complementary to other desired wheel rim surface profiles.

In use, the polisher 10 is wheeled by an operator gripping the handle 13 to move same as indicated by arrow 36 to a position where the polisher head 23 is positioned adjacent a wheel installed on a vehicle to be cleaned/polished. The height of the rotational axis 15 is adjusted as explained previously to approximately the centre of the installed wheel and if necessary any radial adjustment of the support arms 25a, 25b, 25c is made. The polisher is then moved forward in the axial direction to engage the polishing members 29a, 29b, 29c with the wheel rim. Once engaged, the motor 21 is activated to rotate the polishing head 23 and thereby polish the vehicle wheel rim engaged thereby.

It will of course be appreciated that many variations within the scope of the annexed patent claims may be made to the described polisher device.

What is claimed is:

1. A portable vehicle wheel polisher comprising:
   a rotatable polishing head adapted, in use, to rotate about a substantially horizontal rotation axis;
   drive means connected to said polishing head to, in use, rotate said polishing head about said horizontal rotation axis;
   adjustable support means enabling said horizontal rotation axis to be selectably raised or lowered relative to an installed vehicle wheel on a vehicle; and
   ground engaging wheel means carrying said adjustable support means and enabling said portable vehicle wheel polisher to be moved to a position that engages said polishing head with the installed vehicle wheel and to a separate position disengaged from said installed vehicle wheel, wherein said polishing head includes multiple circumferentially spaced support arms radially extending outwardly from a hub rotatable about said horizontal rotation axis, each said support arm carrying a polishing member having an outer profile approximating a profile of at least part of the installed vehicle wheel, and each said polishing member being a moulded semi-solid foam material.

2. A portable vehicle wheel polisher according to claim 1 wherein releasable connection means connects each said polishing member to a said support arm.

3. A portable vehicle wheel polisher according to claim 2 wherein said releasable connection means allows the polishing members to rock relative to the support arm, about a radial direction, in a direction parallel to the horizontal rotation axis.

4. A portable vehicle wheel polisher comprising:
   a rotatable polishing head adapted, in use, to rotate about a substantially horizontal rotation axis;
   drive means connected to said polishing head to, in use, rotate said polishing head about said horizontal rotation axis;
   adjustable support means enabling said horizontal rotation axis to be selectably raised or lowered relative to an installed vehicle wheel on a vehicle; and
   ground engaging wheel means carrying said adjustable support means and enabling said portable vehicle wheel polisher to be moved to a position that engages said polishing head with the installed vehicle wheel and to a separate position disengaged from said installed vehicle wheel,
   wherein said polishing head includes multiple circumferentially spaced support arms radially extending outwardly from a hub rotatable about said horizontal rotation axis, each said support arm carrying a polishing member having an outer profile approximating a profile of at least part of the installed vehicle wheel, wherein releasable connection means connects each said polishing member to a said support arm and wherein each said connection means allows the polishing members to rock relative to the support arm about a radial direction generally in a direction parallel to the horizontal rotation axis.

5. A portable vehicle wheel polisher comprising:
a rotatable polishing head adapted, in use, to rotate about a substantially horizontal rotation axis;
drive means connected to said polishing head to, in use, rotate said polishing head about said horizontal rotation axis;
adjustable support means enabling said horizontal rotation axis to be selectably raised or lowered relative to an installed vehicle wheel on a vehicle; and
ground engaging wheel means carrying said adjustable support means and enabling said portable vehicle wheel polisher to be moved to a position that engages said polishing head with the installed vehicle wheel and to a separate position disengaged from said installed vehicle wheel,
wherein said polishing head includes multiple circumferentially spaced support arms radially extending outwardly from a hub rotatable about said horizontal rotation axis, each said support arm carrying a polishing member having an outer profile approximating a profile of at least part of the installed vehicle wheel, wherein each said support arm is constructed as a spring enabling limited fore and aft movement of the polishing members in a direction parallel to the horizontal rotation axis.

6. A portable vehicle wheel polisher according to claim 5 wherein the polishing head includes a further polishing member connected to said hub for rotation about said horizontal rotation axis, said further polishing member surrounding said horizontal rotation axis and being adapted, in use, to engage a central region of the installed vehicle wheel.

7. A portable vehicle wheel polisher according to claim 6 wherein said further polishing member is releasably connected to said hub of the polishing head.

8. A portable vehicle wheel polisher according to claim 6 wherein the further polishing member has a forward profiled face approximating a profile of at least part of the installed vehicle wheel.

9. A portable vehicle wheel polisher comprising:
a rotatable polishing head adapted, in use, to rotate about a substantially horizontal rotation axis;
drive means connected to said polishing head to, in use, rotate said polishing head about said horizontal rotation axis;
adjustable support means enabling said horizontal rotation axis to be selectably raised or lowered relative to an installed vehicle wheel on a vehicle; and
ground engaging wheel means carrying said adjustable support means and enabling said portable vehicle wheel polisher to be moved to a position that engages said polishing head with the installed vehicle wheel and to a separate position disengaged from said installed vehicle wheel,
wherein said polishing head includes multiple circumferentially spaced support arms radially extending outwardly from a hub rotatable about said horizontal rotation axis, each said support arm carrying a polishing member having an outer profile approximating a profile of at least part of the installed vehicle wheel, and
wherein the polishing head includes a further polishing member connected to said hub for rotation about said horizontal rotation axis, said further polishing member surrounding said horizontal rotation axis and being adapted, in use, to engage a central region of the installed vehicle wheel.

10. A portable vehicle wheel polisher according to claim 9 wherein said further polishing member is releasably connected to said hub of the polishing head.

11. A portable vehicle wheel polisher according to claim 9 wherein the further polishing member has a forward profiled face approximating a profile of at least part of the installed vehicle wheel.

12. A portable vehicle wheel polisher according to claim 9 wherein each said support arm is constructed as a spring enabling limited fore and aft movement of the polishing members connected to each said support arm in a direction parallel to the horizontal rotation axis.

13. A portable device wheel polisher according to claim 9 wherein connection means connects a said polishing member to each said support arm, said connection means allowing said polishing members to rock relative to the support arm.

14. A portable device wheel polisher according to claim 12 wherein connection means connects a said polishing member to each said support arm, said connection means allowing said polishing members to rock relative to the support arm.

* * * * *

UNITED STATES PATENT AND TRADEMARK OFFICE
CERTIFICATE OF CORRECTION

PATENT NO. : 8,668,556 B2  Page 1 of 1
APPLICATION NO. : 13/109575
DATED : March 11, 2014
INVENTOR(S) : McKee It is certified that error appears in the above-identified patent and that said Letters Patent is hereby corrected as shown below:

In the claims:

Column 4,
Line 41, "foam material." should read --foam material including polishing elements.--.

Signed and Sealed this
First Day of July, 2014

Michelle K. Lee
*Deputy Director of the United States Patent and Trademark Office*